Oct. 13, 1970 J. E. McWADE 3,534,397

PUNCHED DATA CARD READER

Filed May 20, 1966 2 Sheets-Sheet 1

INVENTOR.
JOHN E. McWADE

INVENTOR.
JOHN E. McWADE

United States Patent Office 3,534,397
Patented Oct. 13, 1970

3,534,397

PUNCHED DATA CARD READER

John E. McWade, Horsham, Pa., assignor, by mesne assignments, to AMP Incorporated, Harrisburg, Pa.

Filed May 20, 1966, Ser. No. 551,765
Int. Cl. G06k *7/04;* H01h *3/16; 43/08*
U.S. Cl. 235—61.11 2 Claims

ABSTRACT OF THE DISCLOSURE

A punched card reader is disclosed for use with cards of a type having rows and columns of punched holes defining information. The reader features an array of conductive pins arranged in rows and columns corresponding to possible punched hole locations on a card with a planar contact element spaced from the ends of said pins and means to fit a card between said contact element and the pins. A cam is provided to drive the contact element and pins relatively together so that the pins pass through holes in the card to close contact with the contact elements and develop an electrical signal corresponding to the presence of a hole in the card. Adjacent pins of a given row are staggered so as to pass through adjacent holes in the card in a given row toward opposite edges of the holes to provide an improved electrical isolation between pins while maintaining adequate mechanical strength in the pin structure.

BACKGROUND OF THE INVENTION

Punched data card readers are generally employed to convert information stored on punched cards into electrical signals which are typically applied to other data processing, computing, or control equipment. Information is stored on punched data cards according to the presence or absence of perforations at predetermined locations in the card, and, in the standard format, these perforations are small relative to the devices used to sense their presence. In many punched data card readers the presence of a data perforation is sensed when an electrical conducting sensing member establishes electrical contact with a contact plate through the perforation. In these embodiments, electrical isolation of the individual sensing members has been difficult to achieve without compromising the mechanical strength of the sensing member. Furthermore, previous punched data card readers have not provided the capability for performing a switching operation between a pair of sensing members independent of the circuits of all other sensing members.

SUMMARY OF THE INVENTION

This invention relates to readers for punched data cards and more particularly to an improved punched data card reader using electrically conducting sensing probes and a printed circuit board contact plate.

Accordingly, it is an object of this invention to provide a punched data card reader in which the perforation sensing members are arranged to provide improved electrical isolation while maintaining the mechanical strength of the sensing member.

Another object is to provide a punched data card reader in which the sensing members and their related contacts are arranged in switch related pairs operating independently of and with electrical isolation from all other simultaneous sensing operations of the punched data card reader.

A further object is to provide a punched data card reader of relatively simple and inexpensive construction, positive and reliable in operation, and one whose sensing elements are inherently capable of accurate mounting and adjustment within reasonable manufacturing tolerances and operational wear.

Briefly, the punched data card reader of this invention employs two parallel plates with a data card holder therebetween for receiving the punched data cards for the reading operation. The first of the two plates has mounted thereon a plurality of reader pin elements in coplanar arrangement which project into slots in the data card holder. Each of the reader pin elements is elongated and has two ends; the end projecting into the data card holder has a yieldably mounted tip of such dimensions that it will readily pass through the perforations of the data card and the opposite end is provided with a means to attach an electrical conductor. The second plate has on its surface facing the first plate an array of electrical conductors preferably in the form of a printed circuit board that corresponds to the reader pin array of the first plate. Means are provided to reciprocate one or both plates between a closed and open position. In the absence of any solid material in the space between each reader pin on the first plate and its corresponding electrical conductor on the second plate, the reader pin will make contact with the electrical conductor when the plates are in the closed position. This contact completes an electrical circuit between the input circuit means and the output circuit means of the punched data card reader and will occur during the reading operation when the punched data card contains a perforation in a position corresponding to the position of the reader pin. Where there is no perforation in the defined position, the card material between the reader pin tip and the electrical conductor of the opposing plate surface will prevent contact between the two elements. Without this contact, the corresponding circuit between the input circuit means and the output circuit means will remain incomplete, indicating an absence of a perforation in the punched data card in that position.

In accordance with this invention, the reader pins are arranged in a staggered pattern so as to increase the electrical separation between the pins without compromising their structural integrity and the conductor patterns of the contact plate are arranged in a corresponding manner. Furthermore, a modified form of the contact plate conductor pattern permits pairs of reader pins to perform switching operations with both pins of the switch related pair electrically independent of all other reading or switching circuits.

These and other features, objects and advantages of the invention will become more fully evident from the following description based on the accompanying drawings in which.

Figure 1:
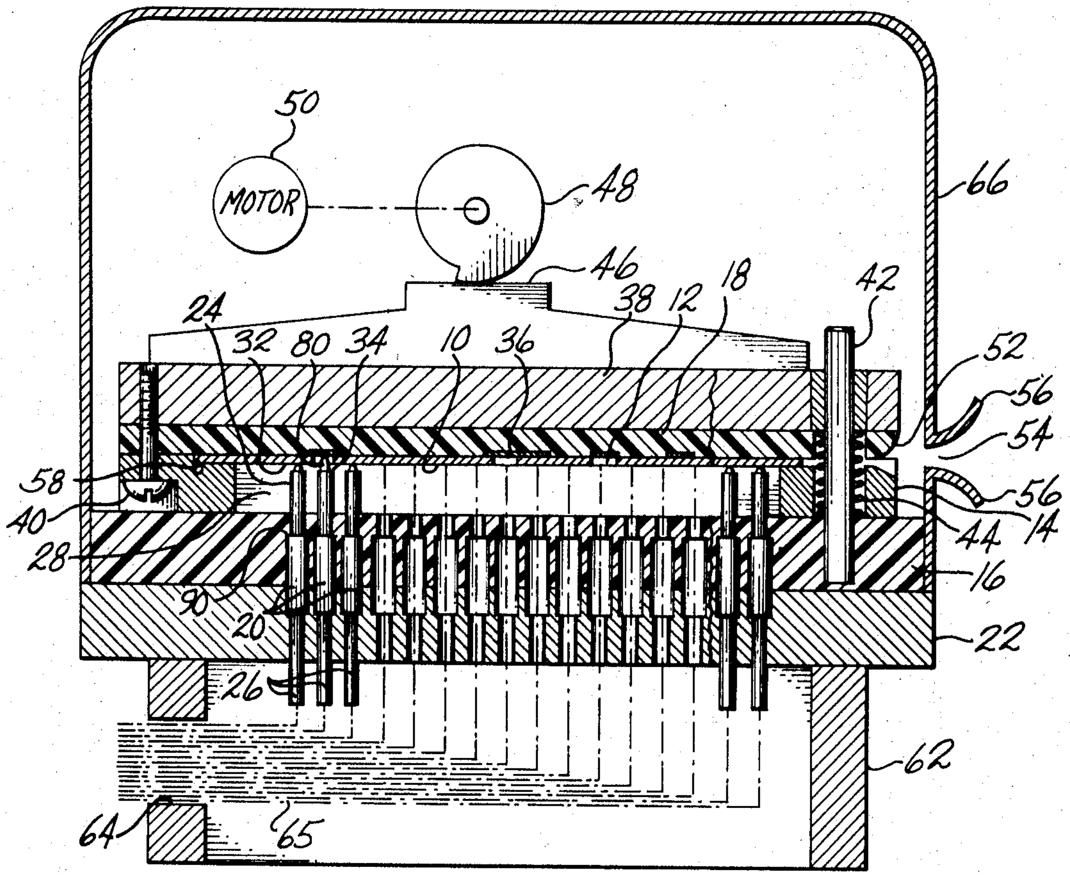
FIG. 1 is a sectional view of one illustrative embodiment of this invention.

Turning to the embodiment illustrated in FIG. 1, a punched data card 10 containing perforations 12 is shown in reading position on a punched data card holder 14 between a reader pin mounting plate 16 and a contact plate 18. Reader pin plate 16 has mounted therein a plurality of reader pins 20 arranged in a predetermined pattern (which will be described hereinafter and held in position by a retainer plate 22. Each reader pin 20 has a tip end 24 and a terminal end 26. The tip end 24 is of reduced diameter and is designed to fit into a counterbored hole in the reader pin plate 16. The tip end of the reader pin extends beyond the reader pin plate and into slots 28 in the data card holder 14 and yieldingly urges reader pin tip projection 80 into contact with the data card 10. If the data card contains no perforations in the area corresponding to the position of a reader pin, as at 32, the reader pin projection 80 will be forced back into the tip end 24 of the reader pin when the data card reader is in reading position. However, if a data card does contain a perforation at such position, as at 34, the reader pin projection 80 will extend through such perforation and yieldingly contact contact plate 18 when the punched data card reader is in reading position.

The contact plate 18 is made of electrical insulating material and has contained on its surface facing the reader pin plate 16 certain patterns of electrical conducting areas or electrical contacts 36 which correspond to the patterns of the reader pins 20 mounted on the reader pin plate 16. Typically, these electrical contacts are in the form of a printed circuit board such that the electrical conducting areas may be either appiled to the surface or imbedded within an electrical insulating material. The electrical conducting areas need only be so incorporated in the contact plate that they will be exposed to those reader pin tips that pass through perforations in the punched data card during the reading operation.

The data card holder 14 and the contact plate 18 are attached to the backing plate 38 by suitable fastening means 40 preferably in a manner that permits convenient removal and exchange of contact plates. If interchangeability is not important in a particular application, the contact plate 18 could be made integral with the backing plate 38. The backing plate 38 is slideably mounted on standards 42 and is suitably biased by springs 44 away from the reader pin plate 16 so that cam bearing surface 46 of the backing plate 38 is urged in contact with cam 48. A suitable motor 50 or other means coupled to cam 48 and causing it to revolve will reciprocate the backing plate 38, contact plate 18 and data card holder 14 alternatively placing them in a closed position for reading the punched data card and in a withdrawn position for insertion or removal of the punched data card. This reciprocal motion may be provided by means other than the rotating cam shown, such as by pneumatic or electric solenoid actuators, toggle mechanisms or manual levers. Also, the motion of the backing plate 38 from the closed position to the withdrawn position may be accomplished in a manner other than the spring biasing means 44. In particular, in some applications of the invention, it may be desirable to provide for positively driving the backing plate 38 to the withdrawn position in order to obtain more positive and faster action, and to prevent the backing plate 38 from jamming on standards 42. It also should be noted that while the preferred embodiment shown here provides for a reader pin plate 16 in a fixed position and a contact plate 18 that is reciprocally movable with respect to reader pin plate 16, it is only the reciprocal motion of one plate with respect to the other that is important. This reciprocal motion may be accomplished by moving either plate with respect to the other, or by moving both plates.

There exists between the contact plate 18 and the data card holder 14 a chamber which receives the punched data card 10. To facilitate insertion of the card, the leading edge 52 of the contact plate 18 is rounded or beveled, the card receiving slot 54 has defining flanges 56, and the data card holder has an indexing surface 58 to provide proper registration of the data card.

When the contact plate 18 and the reader pin plate 16 are in the withdrawn position, the data card is supported by the data card holder 14 clear of the reader pin tips projecting into the slots 28 in the data card holder. Upon rotation of the cam 48, contact plate 18 and data card holder 14 containing data card 10 are depressed against biasing means 44 as the contact plate 18 reaches the closed position. In the closed position, the reader pin tips 80 are depressed and those reader pin tips that are in positions corresponding to perforations in the data card will pass through the perforations and come into contact with the contact plate 18. Those reader pins not in a position corresponding with perforations will be prevented from contacting the contact plate 18 because of the interposition of the data card 10 between the reader pin tip 80 and the contact plate 18. It is the contact of the reader pin tip 80 with a conducting area 36 of the contact plate 18 that provides the intelligence indicating the presence of a perforation in the data card.

After the data card reading operation is completed, further rotation of cam 48 will permit biasing means 44 to move contact plate 18 and data card holder 14 containing data card 10 to the withdrawn position at which time the data card may be removed either manually or by suitable mechanisms.

The punched data card reader is mounted on base 62 provided with opening 64 which permits passing electrical wires 65 from the terminal ends of the reader pins 26 to the equipment controlled by the reader, not shown. For protection from dust, dirt or mechanical damage cover 66 is provided, but it should be easily removable in order to facilitate servicing the punched data card reader.

Figure 2:
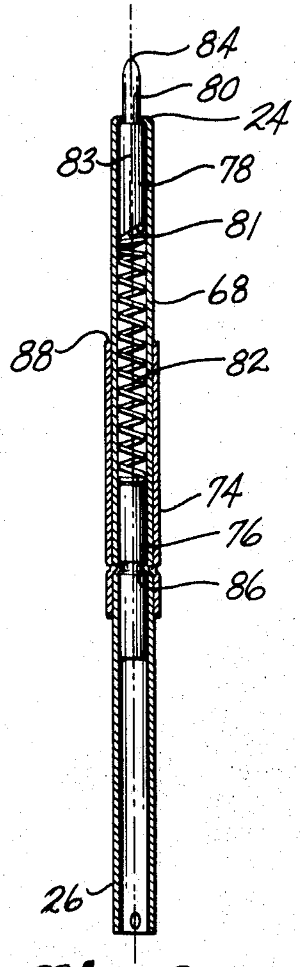
FIG. 2 is an enlarged sectional elevation view of the reader pin of the FIG. 1 embodiment.

Turning now to FIG. 2, each of the reader pins 20 comprises a cylindrical hollow shell 68, having a tip end 24 and a terminal end 26; with a tubular indexing sleeve 74 fitting over the shell and a plug 76 fitting within the shell; a tip 78 captively retained within the shell between plug 76 and the tip end 24. Tip 78 has a projection 80 which extends beyond the tip end 24 of the shell and is biased to that position by spring 82 located and compressed between plug 76 and spring bearing surface 81 of tip 78. Terminal end 26 of the shell is fashioned to receive the attachment of an electrical wire by soldering, quick-disconnect fitting or other suitable means. In order to establish reliable electrical continuity between the terminal end 26 of reader pin 20 and tip contact surface 84, it is recommended that shell 68, plug 76, spring 82, and tip 78 all be made of electrical conducting material.

This reader pin configuration possesses several important advantages. The diameter of the reader pin projection 80 can be made small relative to the perforations to be sensed. This permits correct reading despite small variations in positioning the data card with respect to the reader pin or similar variations in the locations of the data card perforations. Electrical reliability is assured by the combination of spring 82 which allows for a large travel of tip 78 along with a tip projection 80 having a controlled radius at the tip contact surface 84 thereby permitting the application of a controlled amount of spring bias to a small contact area. In addition, improved electrical contact between the tip 78 and shell 68 is obtained when the spring bearing surface 81 of the tip is chamfered at an angle causing a component of the compressive force exerted by the spring to deflect the tip 78 against the inside wall of shell 68. Suitable results are apparent when the spring bearing surface 81 is chamfered at an angle of up to thirty-five degrees measured from an axis transverse to the longitudinal axis 83 of the reader pin 20. This configuration permits repeatable electrical contact characteristics despite variations encountered in conductor contact configurations or in wear characteristics of reader pins.

Interchangeability of the reader pins is facilitated by permanently fixing the reader pin indexing sleeve 74 at a predetermined distance from tip end 24 of the reader pin using suitable fixing means such as soldering, welding, or by crimping both the indexing sleeve 74 and the shell 68 into the annular groove 86 machined into plug 76. If this distance is standardized for all reader pins and if the depth of the counter-bored mounting holes in the reader pin plate is maintained constant, the tip end of the reader pin indexing sleeve 88, in cooperating with the bottom surface of the counter bore 90 will place the tip of the reader pin in proper location with respect to the balance of the mechanism. Thus individual reader pins may be interchanged or replacements inserted without requiring individual adjustments and without impairing the reliability of the card reading operation.

Figure 3:
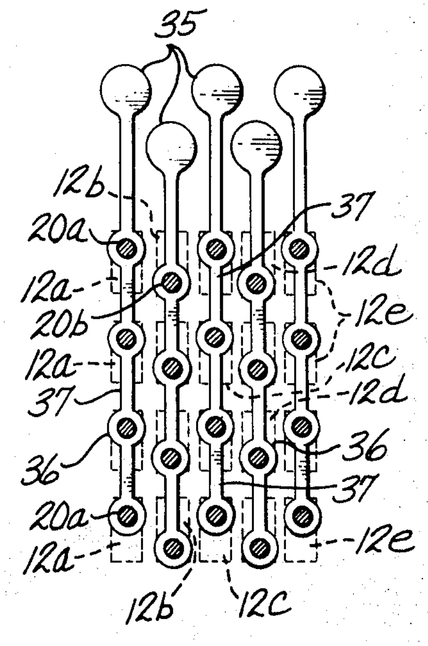
FIG. 3 is a plan view of the contact plate conductor pattern of the embodiment shown in FIG. 1.

In many punched data card designs, the perforations are rectangular in shape and arranged in rows and columns with the spacing between adjacent columns being much less than that between adjacent rows. If each reader pin were positioned so as to engage its respective perforation in the same relative position, the maximum separation between reader pins would be controlled by the limited inter-column spacing of the perforations. However, because the length of the rectangular perforation is approximately twice its width, reader pin spacing can be increased by positioning the reader pins of alternate columns so as to engage a different portion of the respective perforations. Thus, as is illustrated in FIG. 3, reader pins 20*a* are located so as to engage the upper portions of the perforations 12*a* of the first column, while the reader pins 20*b* engage the lower portions of the perforations 12*b* of the second column. This staggering is repeated for subsequent columns producing a staggered array of reader pins which engage alternate portions of adjacent rectangular perforations of the punched data card when the punched card reader is in reading position. This arrangement will not only provide increased structural rigidity of the reader pin plate and ease of mounting the reader pins therein, but the increased separation between the reader pins also provides maximum electrical isolation thus overcoming one of the basic difficulties encountered with data card readers designed to sense individual perforations.. The conductor areas 36 of contact plate 18, being in cooperating relationship with the reader pins, are also arranged in the rows and columns pattern of the punched data card perforations, and like the disposition of the reader pins, should be staggered to take advantage of maximum electrical isolation.

Because the format of punched data card perforations may contain as many as eighty columns of perforation positions with twelve in each column, there is insufficient area available on the surface of the contact plate to provide a separate lead wire to each contact. Therefore, the contacts are normally bussed, or interconnected, with bussed rows and bussed columns being the more common arrangements.

In the bussed column arrangement illustrated in FIG. 3, the contacts 36 of each of the columns are interconnected by bussing strips 37 which terminate in enlarged terminal areas 35 provided for the connection of lead wires. While in this arrangement all the contacts 36 of each column are interconnected by bussing strips 37 to a single terminal area 35 per column, in some instances it may be desirable to provide two terminal areas 35 for each column with certain of the contacts 36 bussed to one terminal area at one end of the column and the remaining contacts bussed to the other terminal area at the opposite end of the column. When the contacts of a particular column are evenly divided between that column's two terminal areas, the arrangement is termed half-column bussing. Similarly, half-row bussing may be employed when the contacts 36 are interconnected by rows instead of columns. The advantage of half-column or half-row bussing is that the total current carrying capacity of the pins of each column or row is thereby doubled. Other arrangements are possible in order to provide for increased current capacity or in order to simplify the punched data card reader logic such as the bussing of specific groups of contacts or common bussing of all contact areas.

Figure 4:
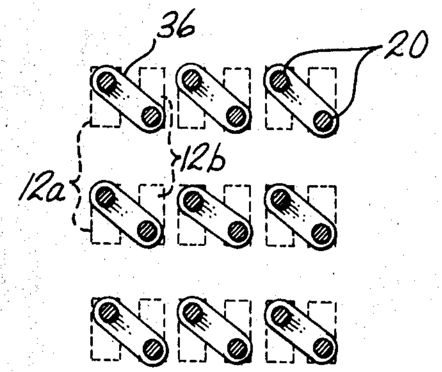
FIG. 4 is a plan view of a modified form of a contact plate conductor pattern which may be employed in the punched data card reader of the present invention.

In some applications it may be desirable to electrically isolate a reading function completely from all other simultaneous reading functions. This result may be achieved by bussing only two contacts instead of a series of contacts in a particular row or column. FIG. 4 illustrates this modified embodiment wherein adjacent pairs of contacts are bussed by enlarging contacts 36 so as to engage two adjacent perforations 12*a* and 12*b* thereby grouping reader pins 20 into switch related pairs. Because each switch related pair of reader pins and their corresponding contacts are electrically independent of all others, each pair performs a switching operation with both sides of the switch electrically isolated from all other switching or reading circuits. This independent switching operation is to be distinguished from the usual configuration wherein one side of the switch is an electrically isolated reader pin but the second side is in the form of a contact bussed in common with a multiplicity of other contacts. While FIG. 4 illustrates reader pins that are adjacent combined to form switch related pairs, clearly any two reader pins could be so combined to perform the isolated switching operation provided their corresponding contacts on the contact plate could be interconnected.

If the contact plate 18 is fabricated from printed circuit board material, these and other bussing arrangements can be readily provided. The fabrication of printed circuit boards is well known in the art and they normally comprise a thin metallic foil bonded to an electrical insulating material. When certain areas of the metallic foil are removed by either chemical or mechanical means, appropriate conductor patterns corresponding to the arrangement of the reader pins, contacts and bussing will remain.

It should be understood, of course, that the foreoing disclosure relates to only a preferred embodiment of the invention and that numerous modifications or alterations may be made therein without departing from the spirit and scope of the invention as set forth in the appended claims.

What is claimed is:

1. An apparatus for reading punched data cards of a type wherein information is defined by punched holes located in rows and columns along common centerlines for a given row and for a given column, said apparatus comprising a mounting means of insulating material carrying an array of reader pins in rows and columns corresponding to the rows and columns of possible hole positions in a data card, a contact plate and means spacing said contact plate from the ends of said reader pins with discrete contact surfaces positioned in alignment with the said reader pins, means to guide and position a data card between the ends of said reader pins and the surface of said discrete surface of said contact plate and means to drive said contact plate and said reader pins relatively together so that said reader pins pass through holes in said card to effect a reading thereof, each reader pin in each row as mounted in said mounting plate being offset from the card row center line in a sense opposite to an adjacent reader pin so as to pass through portions of adjacent holes near opposite edges of such holes in a corresponding row of holes in a card whereby to increase electrical isolation between said pins for a given reader pin size, wherein each reader pin is comprised of a conductive and hollow metal shell containing a compression spring and a reader pin head having a shoulder and a sloped read surface said shell having a turned-in flange at one end cooperating with said shoulder on said head to prevent said heat from escaping from said shell, the said compression spring being operable to engage the sloped rear surface of said head to force said head axially along said shell against said flange and radially against the inner surface of said shell while allowing said head to move a imited amount within said shell to assure good electrical contact with said shell while operating to sense the pressure of holes in data cards.

2. A contact pin for card readers and the like comprising a hollow conductive shell having a turned-in flange at one end and a connecting portion at the other end adapted to be terminated to a signal lead, a slidable reader head positioned in said one end including an outwardly directed shoulder engaging the flange of said shell to limit axial movement out of said shell by said head, said head including a portion projecting forwardly of said outer flange of a reduced diameter to pass through a hole in a data card to engage a contact element of a reader, said other end of said shell further including an inner fixed surface and there being provided a compression spring fitted within said shell bearing against said head and said fixed surface to drive said head axially along said shell, said plug having a sloped rear surface in engagement with said spring whereby the said spring through engagement with said sloped surface tends to hold said plug against one side of the inner surface of said shell to better assure electrical contact between said head and said shell whereby to minimize electrical resistance between a signal lead and a contact element of a reader.

References Cited

UNITED STATES PATENTS

| | | | |
|---|---|---|---|
| 882,328 | 3/1907 | Lieb | 179—100.2 |
| 2,540,654 | 2/1951 | Cohen et al. | 235—61.12 |
| 2,977,434 | 3/1961 | Shanahan et al. | 235—61.11 X |
| 3,148,251 | 9/1964 | Burke | 235—61.11 |
| 2,535,125 | 12/1950 | Ferry | 235—61.12 |
| 2,644,145 | 6/1953 | Adams | 339—222 |
| 3,435,168 | 3/1969 | Cooney | 235—61.11 X |

MAYNARD R. WILBUR, Primary Examiner

T. J. SLOYAN, Assistant Examiner

U.S. Cl. X.R.

200—46, 61.42